Aug. 30, 1932. V. G. APPLE 1,875,205

DYNAMO ELECTRIC MACHINE

Filed Sept. 12, 1929  2 Sheets-Sheet 1

INVENTOR-
Vincent G. Apple

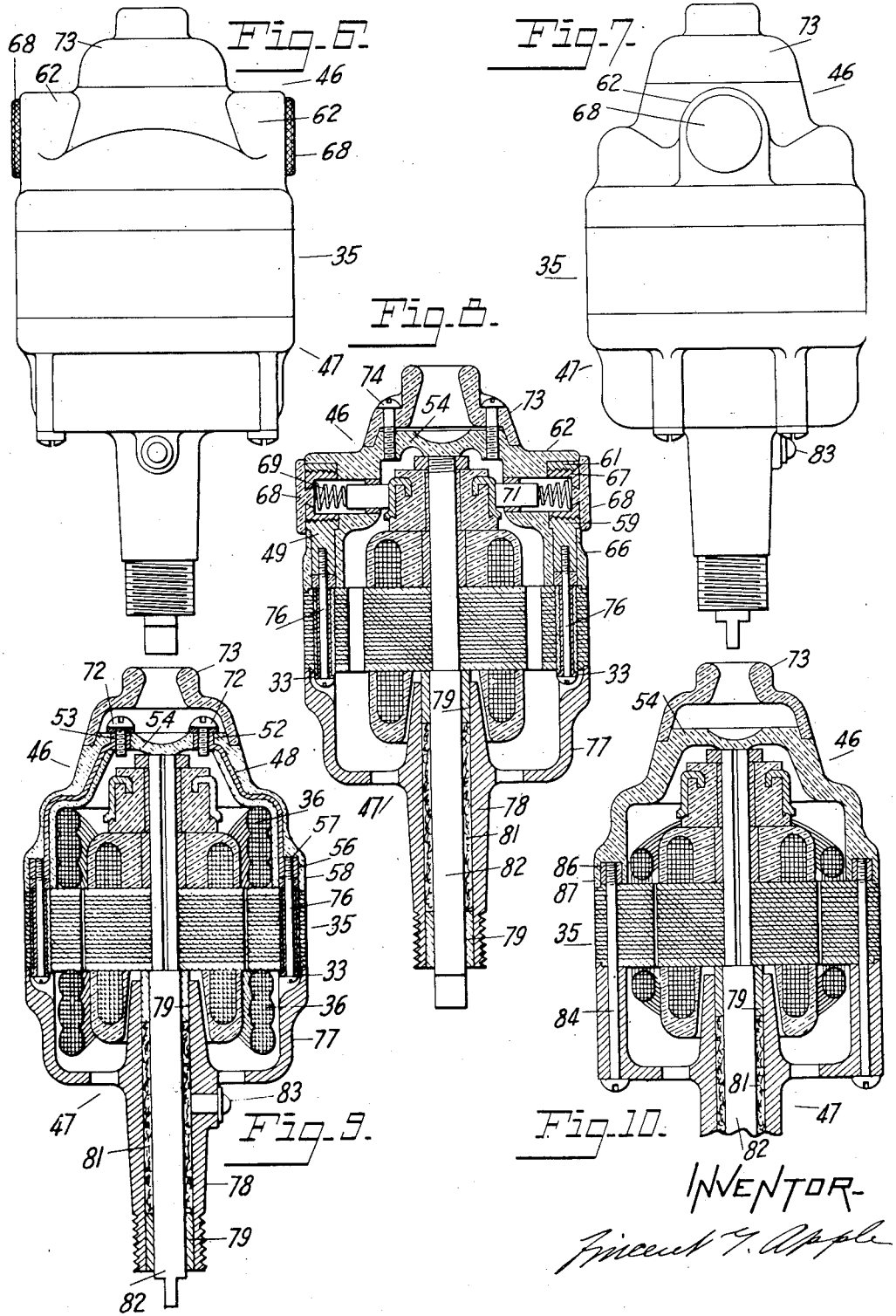

Patented Aug. 30, 1932

1,875,205

UNITED STATES PATENT OFFICE

VINCENT G. APPLE, OF DAYTON, OHIO

DYNAMO-ELECTRIC MACHINE

Application filed September 12, 1929. Serial No. 392,158.

This invention relates to dynamo electric machines.

The object of the invention is to provide improved connecting means whereby the several parts of the winding are electrically joined to each other, and to the brush holding means and the external circuit, without employing loose wires or flexible leads as in common practice.

More specifically the object is to provide a unitary field structure comprising the magnetizable core and the winding, with rigid coil contacts for the several parts of the winding affixed to the core adjacent the coils, and another unitary structure comprising an end closing terminal head of molded insulation having imbedded in its walls the brush and line terminals, the imbedded line terminals being exposed at the outer surface at suitable points for convenient connection to line wires, the imbedded brush terminals being exposed within the brush pockets for suitable connections to the brushes, and both sets of terminals being exposed at the end of the head adjacent the field structure, to the end that, when the two unitary structures are secured together, the exposed ends of both sets of terminals will be brought into electrical contact with the rigid coil contacts on the core and all necessary connections will be thereby completed.

Other objects and meritorious features of the invention will become apparent to one skilled in the art as the invention is described in detail and reference is made to the drawings wherein—

Fig. 6 is an elevation looking in the direction of the arrow 6 Fig. 5.

Fig. 7 is an elevation looking in the directions of the arrow 7 Fig. 5.

Fig. 8 is a vertical axial section taken at 8—8 of Figs. 1 and 5.

Fig. 9 is a vertical axial section taken at 9—9 of Figs. 1 and 5.

Fig. 10 is a vertical axial section taken at 10—10 of Figs. 1 and 5.

Similar numerals refer to similar parts throughout the several views.

Figure 1:
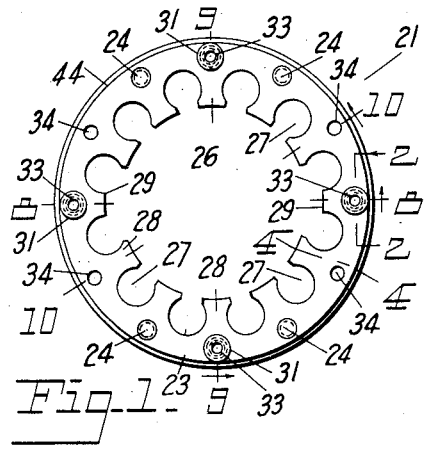
Fig. 1 is a bottom plan view of the core of my improved dynamo electric machine.

The core 21 is preferably composed of a plurality of relatively thin laminæ 22 and the two other laminæ 23 of thicker material, held together by the rivets 24. A central opening 26 is provided for the armature, and spaced about this central opening are a series of winding apertures 27 separated by teeth 28. To adapt the core to a bipolar field two teeth are shortened as at 29.

Figure 2:
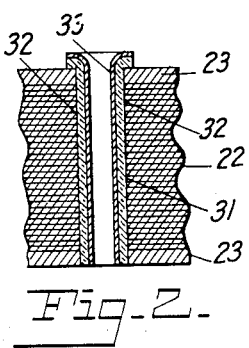
Fig. 2 is a fragmentary section taken to an enlarged scale at 2—2 of Fig. 1 showing one of the tubular coil contacts and the means of insulating it from the core.

Four openings 31 extend lengthwise through the core and are lined as shown in the enlarged fragmentary view Fig. 2 with a bushing 32 of insulation and a thin metal liner 33 within the bushing, both press-fitted to retain them in their respective places. Liners 33 later become, and will be hereinafter called, the coil contacts. Still other openings 34 extend lengthwise through the core, these being for a purpose which will hereinafter appear.

Figure 3:
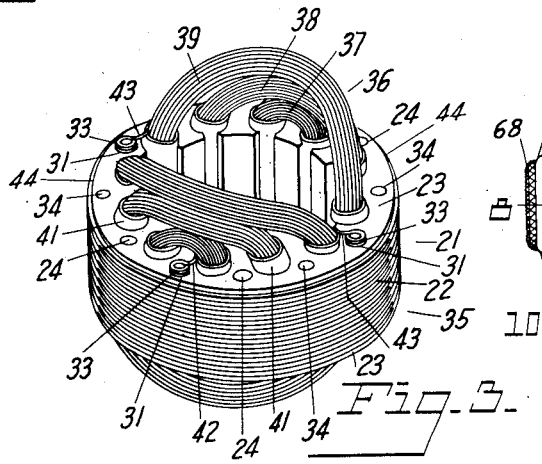
Fig. 3 is a perspective view of the bottom side of the field structure showing how the coil ends are connected to the coil contacts.

To wind the core to compose the bipolar field structure 35, Fig. 3, two coils 36 each composed of three interconnected sections 37, 38 and 39 are employed. The coil sections are preferably wrapped with insulation treated tape 41 before being entered into the aperture 27. Each coil 36 has its beginning connected to one coil contact 33 as at 42 and its end to another coil contact 33 as at 43. The covering of the wire composing the coils is preferably saturated with liquid insulation either before or after it is wound into the coils, and then baked to harden the coils so that they will permanently keep the form shown in Fig. 3. A suitably shaped envelope or brace may be placed around the coils to hold them in the desired shape while they are being hardened.

Figure 4:
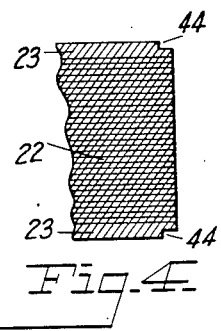
Fig. 4 is a fragmentary section through the core on the line 4—4 of Fig. 1 showing how the two outer thicker laminæ are rabbeted before securing the heads to the field structure to the end that the heads may be located concentrically with the field bore.

The annular rabbets 44, Fig. 4, are preferably turned in the thick outer laminæ 23 after the field structure 35 has been wound and connected as in Fig. 3. They should be concentric with the armature opening 26, so as to concentrically locate the terminal head 46 and the bearing head 47.

Figure 5:
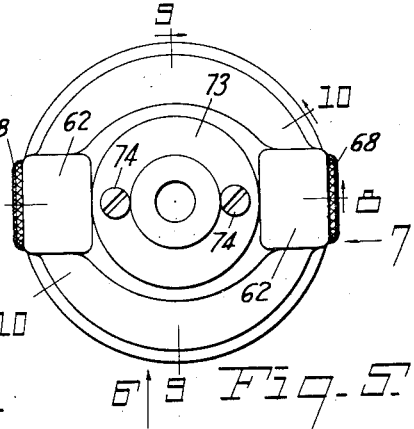
Fig. 5 is a top plan view of the completed dynamo electric machine.
Figure 11:
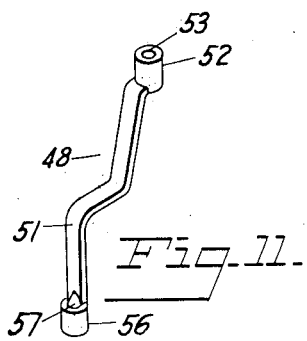
Fig. 11 is a detail view in perspective of one of the line terminals.
Figure 12:
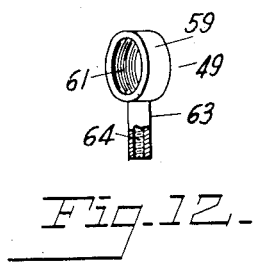
Fig. 12 is a detail view in perspective of one of the brush terminals.

The terminal head 46 is made of molded insulation in the form of an inverted cup with two line terminals 48 and two brush terminals 49 imbedded in the side walls of the cup. The line terminals 48 (see Fig. 11) each consists of a strip of metal 51 bent as shown and having a hub 52 tapped as at 53 adapted to extend through the closed end 54 of the cup (see Fig. 9) for connections to the line, and a hub 56 tapped as at 57 (see Fig. 11) and adapted to extend through the relatively thick portion 58 at the rim of the cup for connections to coil contacts 33 of the field structure 35 (see Fig. 9). The brush terminals 49 (see Fig. 12) each consist of a ring 59 tapped as at 61 and adapted to extend through the bosses 62 (see Fig. 8) in the sides of the cup, and a stem 63 tapped as at 64 (see Fig. 12) and adapted to extend through the relatively thick portions 66 at the rim of the cup for connection to other of the coil contacts 33, (see Fig. 8). Threaded metal caps 67 covered with insulation heads 68 close the openings 61 and complete an electric circuit from rings 59 to springs 69 to brushes 71. Screws 72 extend into tapped holes 53 (see Fig. 9) and are adapted to secure the two ends of a lamp cord to hubs 52. A separately molded cap 73 is secured to the head 46 by screws 74 (see Figs. 5 and 8). Cap 73 is adapted to cover the cord connections to prevent accidental contact therewith.

It will be seen that when the molded terminal head 46 is secured to the field structure 35 by the screws 76 (see Figs. 8 and 9) an electric circuit will be established from a screw 72 through a line terminal 48, a screw 76 to a coil contact 33, through a field coil 36 to another coil contact 33, through a brush terminal 49, a brush cap 67, a spring 69, a brush 71, to the armature, through the armature to the other brush 71, spring 69, cap 67, terminal 49, to a contact 33, through the other field coil 36 to another contact 33, through the other line terminal 48 to the other screw 72.

The bearing head 47 may be any suitable material and comprises the cup shaped portion 77 with the integral hub 78 adapted to carry bearing bushings 79 and a lubricating bushing 81 of felt or similar absorptive material. The armature shaft 82 is fitted to rotate freely in these bearing bushings and since they are considerably spaced apart no bearing is required at the commutator end where oil is objectionable. An oil cup 83 is provided through which oil may be injected to saturate the lubricating bushing 81. Screws 84 (see Fig. 10) extend through bearing head 47 through the holes 34 of field unit 35 (see Fig. 3) into tapped metal inserts 86 imbedded in the relatively thick part 87 of the head 46, to hold the bearing head 47 in place (see Fig. 10).

The structure herein shown and described differs from the conventional design in many respects, the greatest departure from standard practice being the manner in which the connections are made. In the ordinary structure of this type there would be four flexible leads, two from the ends 42 of the field coils to the line terminal screws 72, and two from the ends 43 of the field coils to the brushes 71. Such flexible leads are always considerably longer than the distance between the points which they are intended to connect because the connections are made inside of the heads with the heads removed a considerable distance from the core, so as to make the screws which must be tightened, accessible, then, after the connections are made, the head is brought toward the core by bending the leads and laying them into the space inside the head and around the rotatable armature, and great care is of course necessary to prevent contact of the leads with the rotatable member, and to provide safe space for these long leads the heads are of considerably greater diameter than is necessary in my improved structure.

There is then the considerable advantage in adopting my improvements in that inasmuch as the connectors employed require less space than the flexible leads of common practice a dynamo electric machine of the same capacity may be made smaller and with less material than by conventional methods.

Further advantages reside in the convenience with which the several main parts of my structure are disassembled, since by the simple act of removing several screws the members are separated and the connections unmade at one and the same time, and while making and unmaking the connections of conventional design any considerable number of times usually results in broken leads, such a result cannot occur in my improved structure.

Having described my invention, I claim:

1. As part of a dynamo electric machine comprising a core with coils having end turns extending axially from the end of the core, a structure comprising a hollow removable terminal head of insulation, having side walls and a closed end, surrounding the said end turns and closing the end of the machine, rigid terminals contained in the said side walls, one end of each terminal extending to and through the said closed end and the other end extending to and through the end of the side wall adjacent the core and having electrical communication with the said coils, and a hollow cap of insulation having a central opening adapted to receive a two conductor lamp cord secured to said closed end, covering the terminal ends where they extend through the said closed end.

2. As part of a dynamo electric machine having a field core, brushes, and a field winding divided into two parts and having end turns extending axially from the end of the core, a structure comprising a hollow removable terminal head of insulation, having side walls containing brush pockets and a closed end, surrounding the said end turns and closing the end of the machine, rigid brush terminals extending axially through the said side walls from the end adjacent the core to and into the said brush pockets and making contact with the said brushes, and rigid line terminals extending axially through the said side walls from the end adjacent said core to and through the said closed end, the ends of said terminals adjacent said core being connected, a line terminal to the beginning of each half of the winding and a brush terminal to the end of each half of the winding.

3. The combination, in a dynamo electric machine, of a core, coils on said core, coil contacts rigidly secured to said core and electrically insulated therefrom, the beginnings and ends of said coils being connected to said contacts, a hollow removable terminal head of insulation having side walls and a closed end, rigid terminals imbedded in said side walls, and means to electrically connect said terminals to said contacts.

4. The combination, in a dynamo electric machine, of a field core of magnetic material, coils on said core, coil contacts electrically joined to the beginnings and ends of said coils, said contacts being rigidly secured to said core and electrically insulated therefrom, a hollow removable terminal head of insulation, having side walls containing brush pockets and an enclosing end, surrounding the ends of the coils and enclosing the end of the machine, brush and line terminals enclosed in and extending lengthwise through the side walls of said head, said brush terminals having their outer ends exposed within said pockets, and said line terminals having their outer ends exposed through the said closed end, both kinds of terminals having their inner ends extending through the end of the side wall adjacent the core and in line with the said coil contacts, and a common means to secure the said head to the said core and hold the said terminals in electrical communication with the said coil contacts.

5. The combination, in a dynamo electric machine of a core having a central opening, a winding extending axially from said core surrounding said central opening, coil contacts fixed to the end of said core surrounding said extending winding, the ends of the coils of said winding being connected to said coil contacts, a removable cup-shaped head of insulation surrounding said extending winding and having the edge of the cup against the end of the core, the said edge having pockets to contain said coil contacts, and metal line terminals secured to said contacts and extending from said contacts wholly within the side wall of said cup to the closed end of said cup and there coming to the surface for connection to the line.

In testimony whereof I affix my signature.

VINCENT G. APPLE.